(12) United States Patent
Maddocks et al.

(10) Patent No.: US 7,986,206 B2
(45) Date of Patent: Jul. 26, 2011

(54) MAGNET CAP

(75) Inventors: Ronald R. Maddocks, Westminster, CO (US); Eckhard Deflize, Riedstadt (DE); Ronald Hernandez, Shreveport, LA (US)

(73) Assignee: Avaya Inc., Basking Ridge, NJ (US)

( * ) Notice: Subject to any disclaimer, the term of this patent is extended or adjusted under 35 U.S.C. 154(b) by 309 days.

(21) Appl. No.: 12/203,437

(22) Filed: Sep. 3, 2008

(65) Prior Publication Data
US 2009/0058583 A1    Mar. 5, 2009

Related U.S. Application Data

(60) Provisional application No. 60/969,930, filed on Sep. 4, 2007.

(51) Int. Cl.
*H01F 7/02* (2006.01)

(52) U.S. Cl. .................. 335/303; 156/73.1; 264/248

(58) Field of Classification Search .......... 335/303–305; 156/73.1–73.5; 264/248
See application file for complete search history.

(56) References Cited

U.S. PATENT DOCUMENTS 4,810,987 A * 3/1989 Liebthal et al. ............... 335/302

* cited by examiner

*Primary Examiner* — Ramon M Barrera
(74) *Attorney, Agent, or Firm* — Muncy, Geissler, Olds & Lowe, PLLC

(57) ABSTRACT

One or more method(s), system(s), and/or device(s) produces an assembly for securing a product to a dissimilar material, such as a magnet to plastic. A magnet assembly may include a plastic cap having one or more wings extending laterally from a side surface of the plastic cap. A plastic holder defines a product cavity and has one or more grooves formed to integrally fit with the one or more wings of the plastic cap. A magnet is positioned within the product cavity. The plastic cap is joined to the plastic holder, such as through staking or welding, to capture the magnet within the product cavity.

9 Claims, 5 Drawing Sheets

MAGNET CAP

This application claims the benefit of U.S. Provisional Application No. 60/969,930, filed Sep. 4, 2007, the entire contents of which are herein incorporated by reference.

BACKGROUND OF THE INVENTION

1. Field of the Invention

This description generally relates to securing magnets within or to plastic parts, and more particularly to one or more methods, devices, and/or systems for attaching a magnet or other non-plastic part to a plastic part in a variety of manufacturing applications.

2. Description of the Related Art

The staking of plastic materials is one technique for joining materials, such as thermoplastic materials. There are four common methods of staking, including cold staking, heat staking, thermo staking, and ultrasonic staking or welding. The choice of the joining process is often dependent upon the materials to be joined, the loads to which the assembly will be subjected and/or the required cosmetic appearance.

In each case, accurate alignment of the components is important to the quality of the joint. The common design parameters may include stud diameter, stud height and stud geometry. Due to the deformation of previously formed parts, effective staking is often restricted to thermoplastic materials. For example, in heat staking, a probe is heated so that less pressure is required to form a head on a stud. This widens the application of staking to a broader spectrum of thermoplastic materials than is possible with cold staking, including glass-filled materials. The quality of the joint is dependent on control of the processing parameters: temperature, pressure and time—a typical cycle time might be between 1 to 5 seconds.

Heat staking has the advantage that parts can be disassembled. It also has the flexibility to allow the simultaneous formation of a large number of studs and to accommodate a variety of stud head designs.

SUMMARY OF THE INVENTION

The present inventors have determined that the use of staking processes to join dissimilar materials, such as in the manufacture of telecommunications devices may produce inconsistent results. For example, heat-staking a magnet directly to a plastic part within a mass-produced telephony device may produce inconsistent results in high volume manufacturing, e.g., inconsistency in location and dimensional tolerances from telephony device to telephony device.

Alternatively or in addition, a magnet secured in a conventional housing or recess with heat staking may be easily broken loose from the plastic part, e.g., even when the magnet is held in place properly the difference between the coefficients of expansion of the magnet and the plastic results in the magnet not being held securely in place, such that the magnet may rattle within the telephone enclosure.

The present invention allows the use of several joining processes, including staking processes to securely, accurately, and consistently join a magnet or other material to a plastic part.

In one general aspect, a method for securing a product having a dissimilar material to a plastic part includes positioning the product within a recess of a bucket having stepped grooves. A cap is positioned over the bucket, wherein one or more wings of the cap integrally fit within the grooves of the bucket. The cap is joined to the bucket to form an assembly. The product is encapsulated within the bucket and the cap by one or more ribs extending away from the cap or bucket.

Implementations of this aspect may include one or more of the following features. For example, the cap may be joined to the bucket by heat staking the cap to the bucket. The cap may be joined to the bucket by ultrasonic welding. The cap and bucket may comprise thermoplastic, such as acrylonitrile butadiene styrene (ABS) thermoplastic. The product may include a magnet, such as a cylindrically shaped magnet formed to fit with an interference fit within the bucket.

In another general aspect, a magnet assembly includes a magnet cap having one or more wings extending laterally from a side surface of the magnet cap, a magnet bucket defining a product cavity and having one or more grooves formed to integrally fit with the one or more wings of the magnet cap, and a magnet positioned within the product cavity, wherein the magnet cap is joined to the magnet bucket to encapsulate the magnet within the product cavity.

Implementations of this aspect may include one or more of the following features. For example, the magnet cap and/or magnet bucket may comprise thermoplastic, such as ABS thermoplastic. The magnet cap may comprise two, three, or more wings. The magnet bucket may comprise two or three, or more, stepped grooves shaped to integrally secure a portion of the two or three, or more, respective wings of the magnet cap therein. The magnet cap may be joined to the magnet bucket through staking, such as heat staking or ultrasonic staking (welding). The magnet cap may include one or more ribs extending from an underside of the magnet cap into the product cavity to securely engage the magnet therein. The magnet cap may include one or more stepped edges on an upper side thereof, the stepped edges being formed to integrally fit with one or more attachment ribs on the magnet bucket which define the one or more grooves of the magnet bucket. The magnet cap may include a substantially round body portion and the one or more wings may extend generally laterally away from a center of the round body portion. The magnet bucket may comprise a substantially cylindrical body portion which defines the product cavity. The cylindrical body portion may further include the one or more ribs of the magnet bucket which define the one or more grooves of the magnet bucket. The magnet may be a substantially cylindrically shaped magnet which fits with an interference fit within the product cavity when encapsulated by the joined magnet cap and magnet bucket.

Implementations of this aspect may include one or more of the following features. For example, the magnet cap may include multiple wings, e.g., two, three, four-winged configurations, for securing to a bucket. The magnet may be secured to the magnet cap or to the magnet bucket prior to joining the magnet cap to the magnet bucket. The magnet cap may be removed for access to the magnet held within the magnet bucket for inspection and/or replacement, e.g., if a heat staking joining process is utilized.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein.

DETAILED DESCRIPTION OF THE INVENTION

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
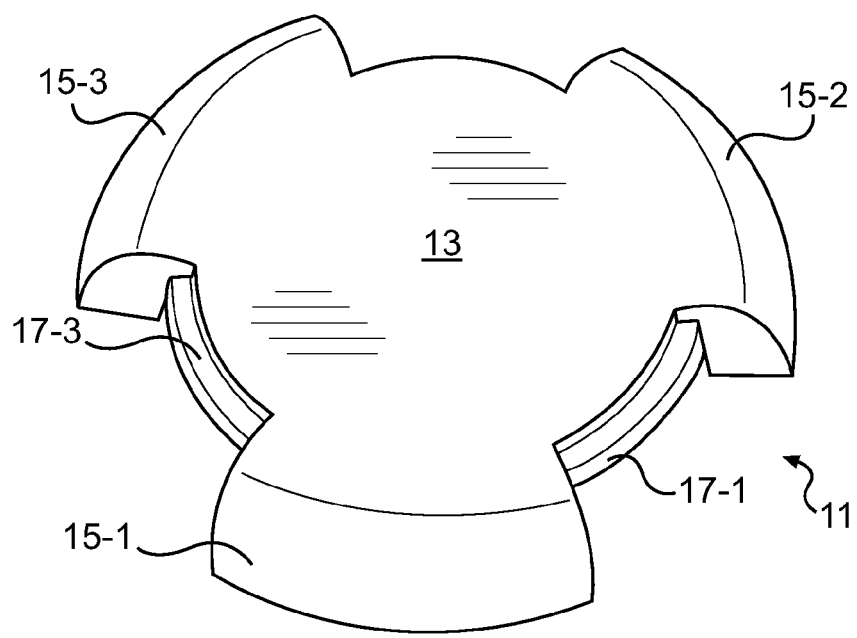
FIG. 1 is a perspective view of a top of a cap in accordance with the present invention.

FIG. 1 is a perspective view of a top of a plastic cap 11, in accordance with the present invention. In one embodiment, the plastic cap 11 is formed of a thermoplastic, such as acrylonitrile butadiene styrene (ABS) thermoplastic. The plastic cap 11 includes a substantially round midsection 13. One or more wings 15 extend laterally from a side surface of the plastic cap 11. In the illustration of FIG. 1, three wings 15-1, 15-2 and 15-3 extend away from a center of the midsection 13. Stepped edges 17 may optionally be provided between the wings 15. In the illustration of FIG. 1, three stepped edges 17-1, 17-2 and 17-3 exist between the three wings 15-1, 15-2 and 15-3.

Figure 2:
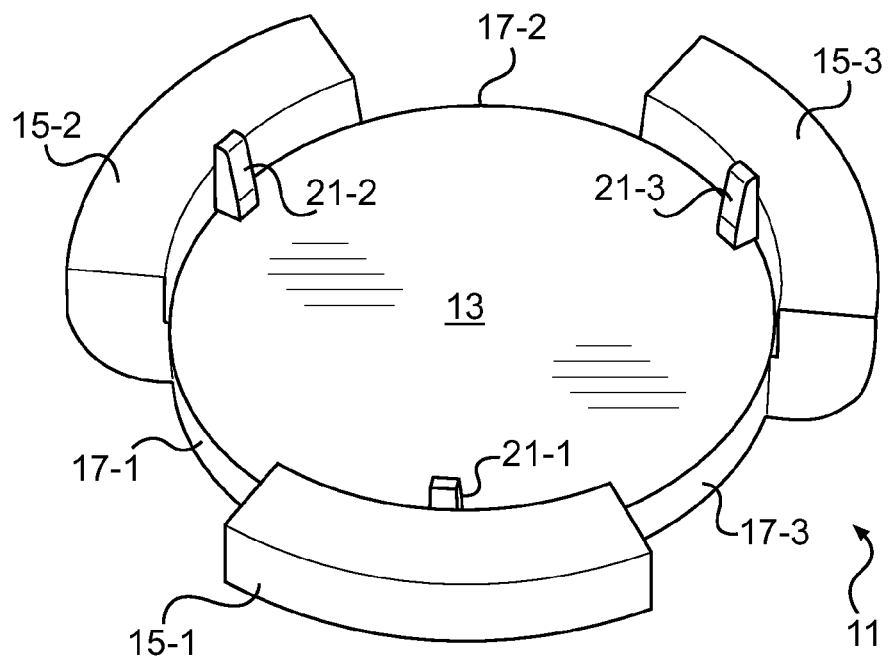
FIG. 2 is a perspective view of a bottom of the cap of FIG. 1.

FIG. 2 is a perspective view of a bottom of the plastic cap 11 of FIG. 1. FIG. 2 illustrates the presence of at least one ramp-shaped rib 21 extending away from the plane of the midsection 13 in a direction substantially perpendicular to the lateral extension of the wings 15. In the illustration of FIG. 2, three ramp-shaped ribs 21-1, 21-2 and 21-3 exist on the bottom of the plastic cap 11. Each rib 21 tapers from a base attached to the plastic cap 11 to a relatively narrower free end.

Figure 3:
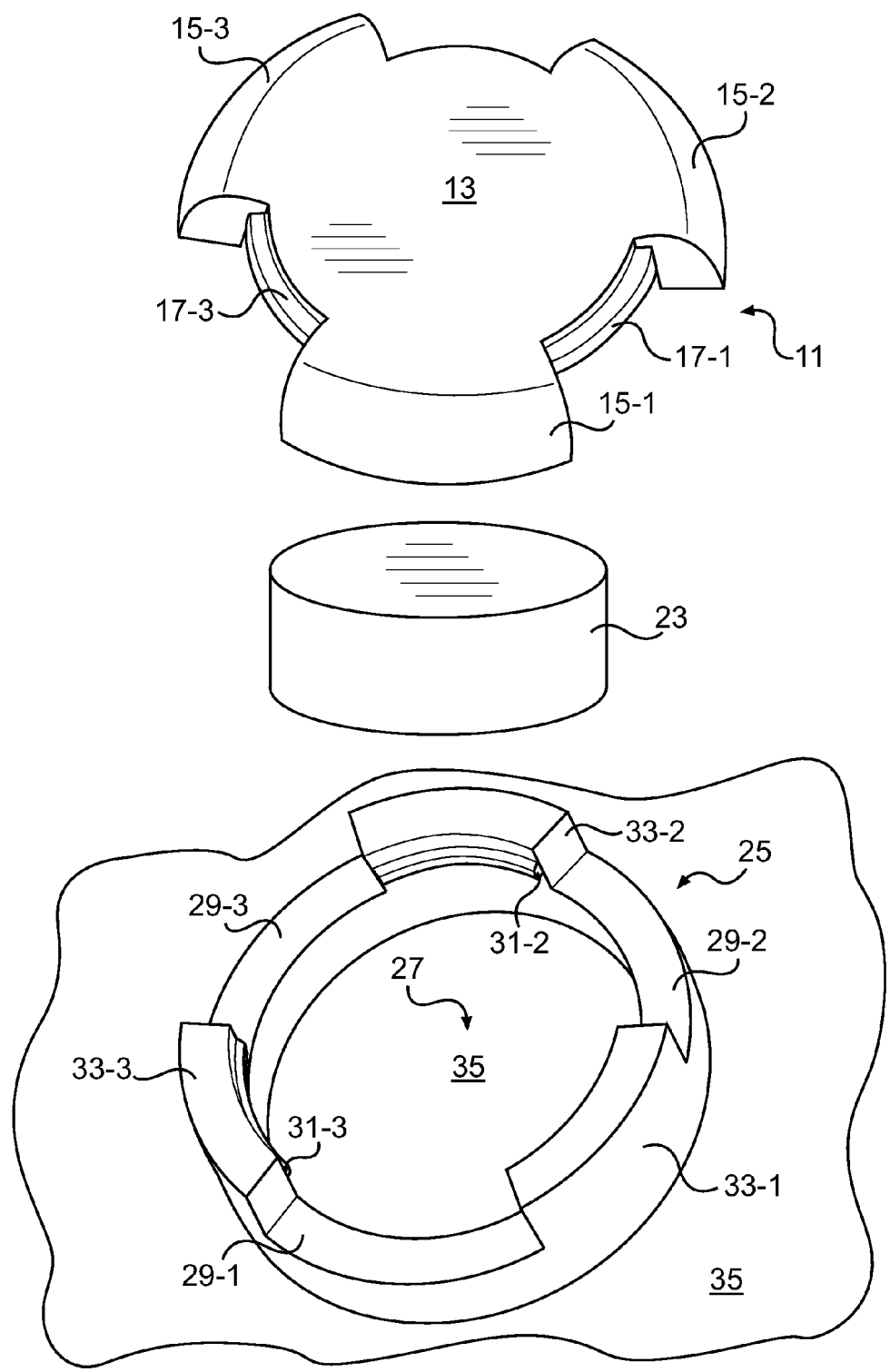
FIG. 3 is an exploded view of a bucket, a magnet and the cap of FIGS. 1 and 2 illustrating an assembly method.
Figure 4:
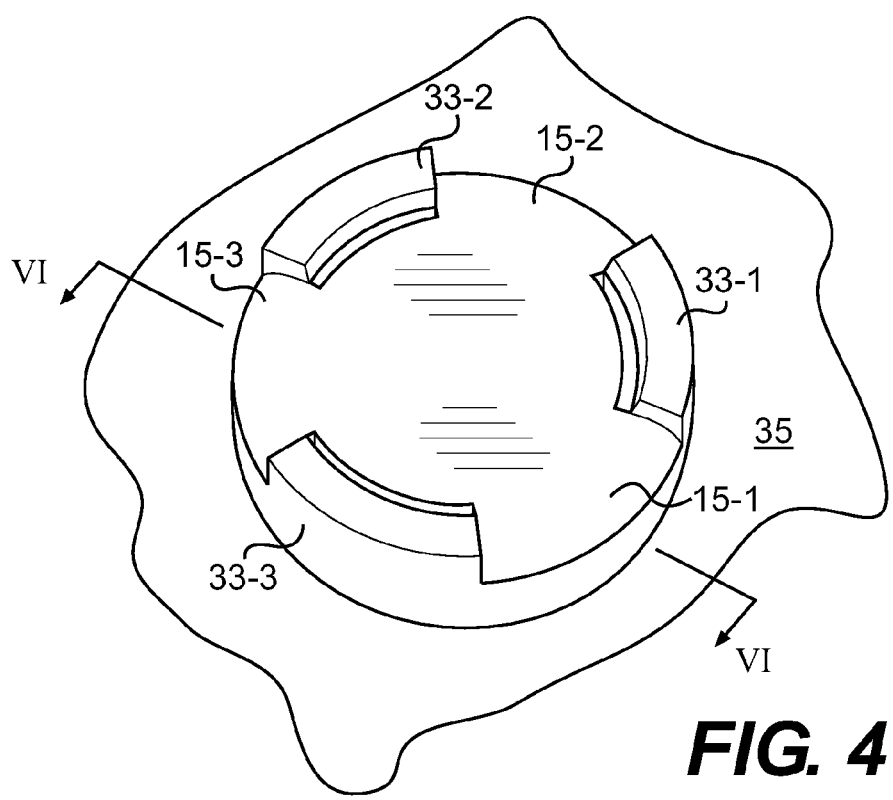
FIG. 4 is perspective view of a top of the assembled bucket, magnet and cap prior to an attaching step.

FIG. 3 is an exploded view illustrating an assembly of the plastic cap 11 of FIGS. 1 and 2 and a non-plastic part 23 and a plastic holder 25, such as a plastic bucket. In one embodiment, the non-plastic part 23 is a disc-shaped magnet. Although a magnet has been illustrated, the non-plastic part 23 could be formed of other materials dissimilar to plastic, such as metal, wood, glass or ceramic.

The plastic holder 25 forms a recess or product cavity 27. In one embodiment, the product cavity 27 is cylindrical in shape, such that the non-plastic part 23 can fit therein. Typically, the plastic holder 25 is attached to, or integrally formed with, a plastic base 35, which forms a floor for the product cavity 27. In one embodiment, the plastic holder 25 is formed of a thermoplastic, such as acrylonitrile butadiene styrene (ABS) thermoplastic.

A rim defining an opening to the product cavity 27 includes at least one groove 29 formed therein. In the illustration of FIG. 3, three grooves 29-1, 29-2 and 29-3 exist along the rim of the product cavity 27. The three grooves 29-1, 29-2 and 29-3 are sized to accept, in a close fitting relationship, the three wings 15-1, 15-2 and 15-3 of the plastic cap 11. Attachment ribs 31 may optionally be provided on the plastic holder 25 on the upstanding portions 33 defining the grooves 29. In the illustration of FIG. 3, three rounded attachment ribs 31-1, 31-2 and 31-3 face inwardly from three upstanding portions 33-1, 33-2 and 33-3 along the periphery of the product cavity 27.

Now, with reference to FIGS. 3-6, a method for securing the non-plastic part 23 to the plastic holder 25 will be described. First, the non-plastic part 23 is positioned within the product cavity 27 of the plastic holder 25. Next, the plastic cap 11 is superimposed or positioned over the plastic holder 25. The one or more wings 15 of the plastic cap 11 are fitted within the corresponding one or more grooves 29 of the plastic holder 25.

Figure 6:
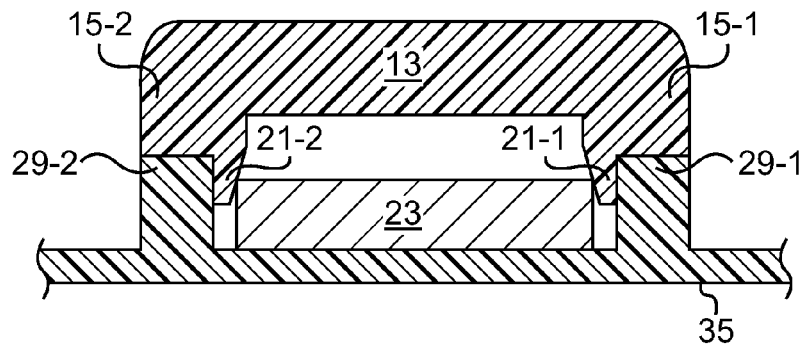
FIG. 6 is a cross sectional view taken along line VI-VI in FIG. 4.

As best seen in the cross sectional view of FIG. 6, as the plastic cap 11 is pressed onto the plastic holder 25, the ramp-shaped ribs 21 engage a side surface of the non-plastic part 23 to wedge the non-plastic part 23 within the product cavity 27 with an interference fit. If the optional stepped edges 17-1, 17-2 and 17-3 are provided on the plastic cap 11 and the optional attachment ribs 31-1, 31-2 and 31-3 are provided on the plastic holder 25, these features may snap past each other to hold the plastic cap 11 on the plastic holder 25.

Figure 5:
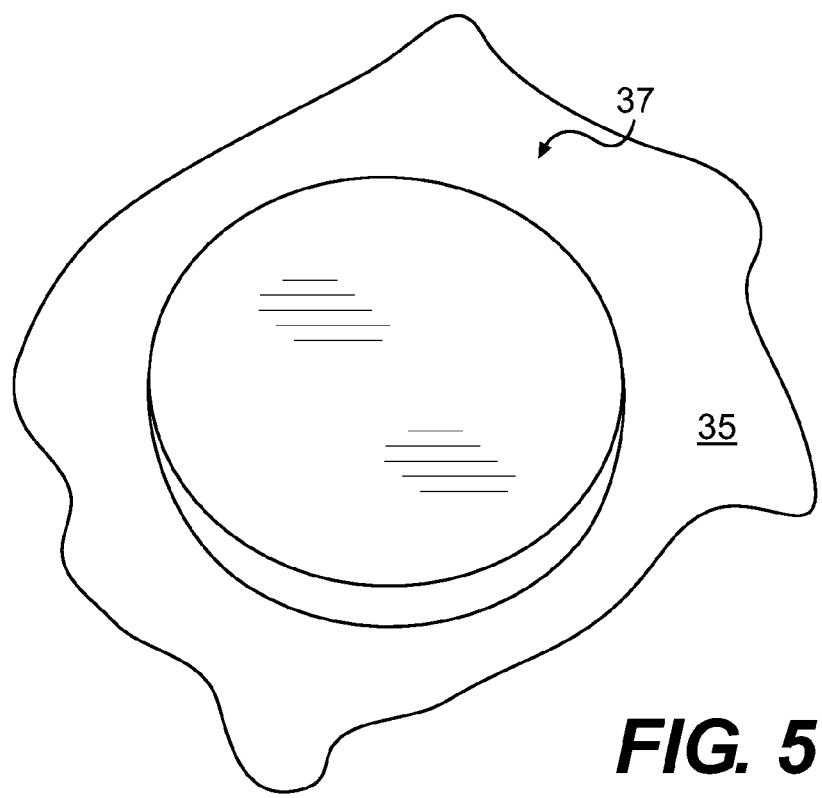
FIG. 5 is a perspective view of the top of the assembled bucket, magnet and cap after the attaching step.

Finally, while the plastic cap 11 is fully seated onto the plastic holder 25, the plastic cap 11 and plastic holder 25 are joined by a fixed joint to capture the non-plastic part 23 in the product cavity 27 and form an assembly 37. The fixed joining of the plastic cap 11 and the plastic holder 25 can be accomplish by cold staking, heat staking, thermo staking, ultrasonic staking or welding, or any other known means of joining two like plastic parts. FIG. 5 is a perspective view of the assembly 37 of the plastic cap 11 joined to the plastic holder 25 by heat staking. As seen in FIG. 5, the assembly 37 is substantially uniform in shape, as the individual elements of the plastic holder 25 and the plastic cap 11 have become joined together and substantially indistinct from each other during the heat staking process.

Figure 7:
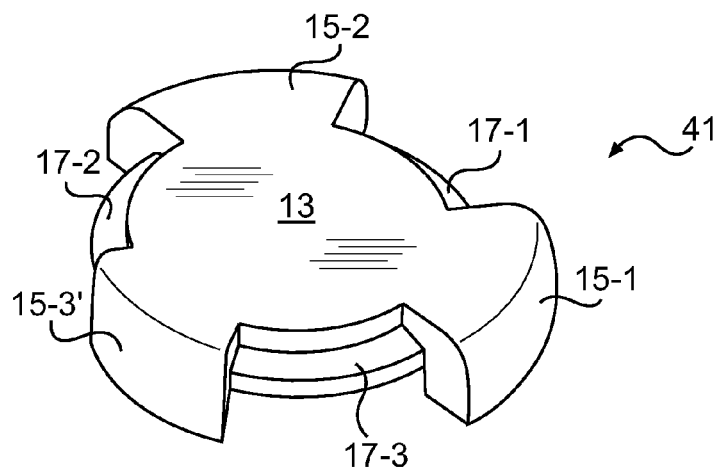
FIG. 7 is a perspective view of a top of a cap in accordance with a second embodiment of the present invention.
Figure 8:
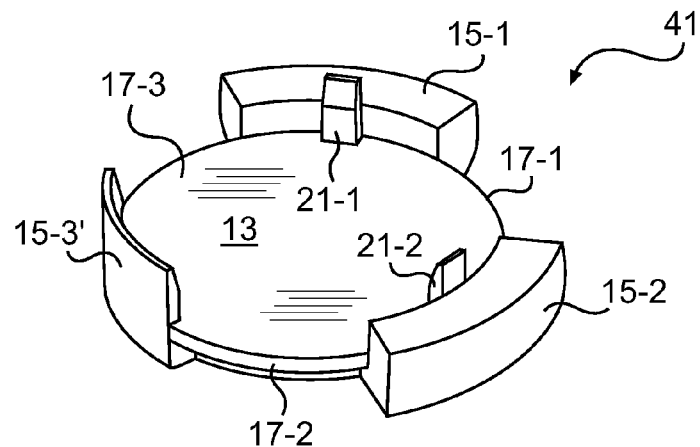
FIG. 8 is a perspective view of a bottom of the cap of FIG. 7.

FIGS. 7 and 8 illustrate a modified cap 41 in accordance with an alternative embodiment of the present invention. FIG. 7 is a perspective view of a top of the modified cap 41. FIG. 8 is a perspective view of a bottom of the modified cap 41 of FIG. 7. Like elements to the plastic cap 11 of FIGS. 1 and 2 have been labeled with the same reference numerals.

A primary distinction between the modified cap 41 and the plastic cap 11 of FIGS. 1 and 2 is that the third wing 15-3' is greatly shortened so that it substantially follows the outer circular periphery of the midsection 13 of the modified cap 41.

Figure 9:
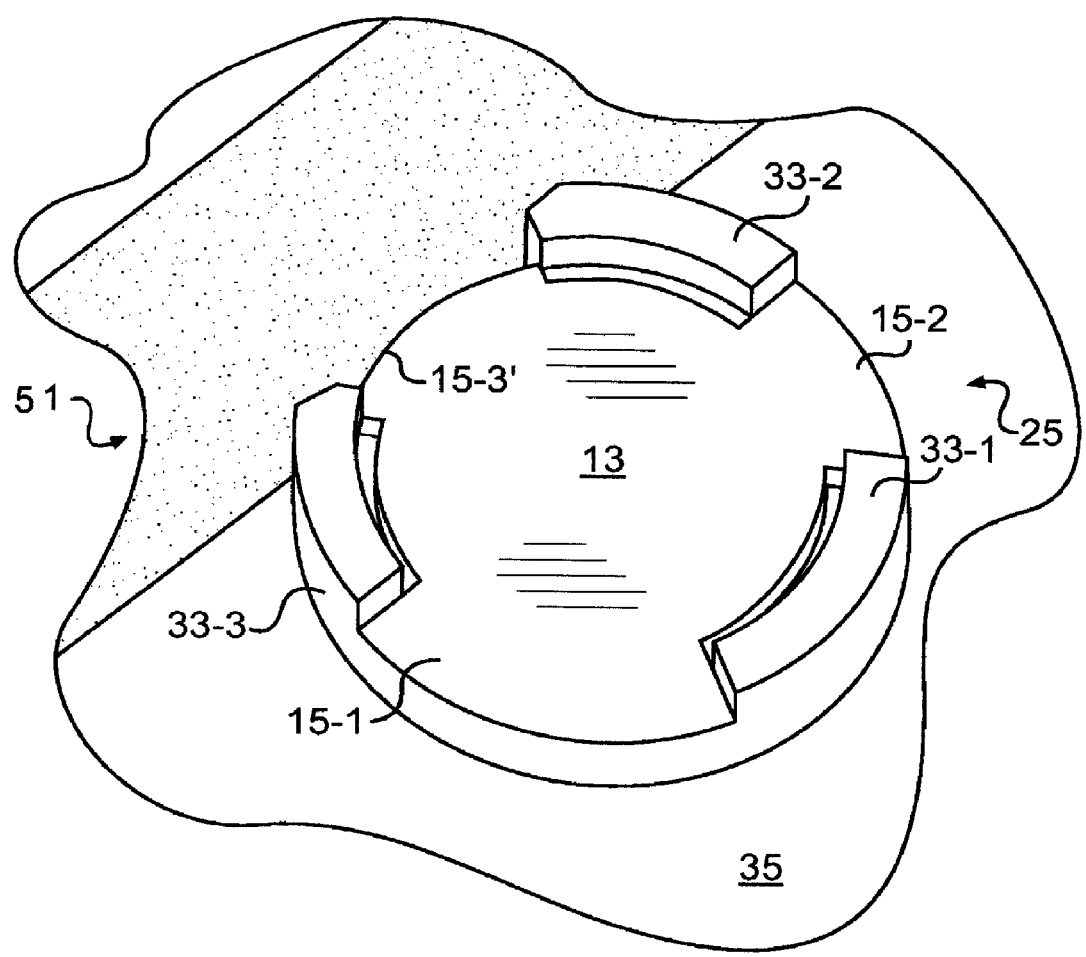
FIG. 9 is a perspective view of the cap of FIGS. 7 and 8 assembled on a bucket adjacent to an obstruction.

As best illustrated in FIG. 9, when the plastic holder 25 is located on a portion of the plastic base 35 which is immediately adjacent to an obstruction 51, like the protruding channel, the modified cap 41 can be employed to avoid interference with the obstruction 51. As illustrated in FIG. 9, the short wing 15-3' is placed in the groove 29-3 between the upstanding portions 33-2 and 33-3. By this arrangement, the modified cap 41 will not contact the obstruction 51, whereas the plastic cap 11 of FIG. 1 could not have been employed with the plastic holder 25 of FIG. 9, because the third wing 15-3 would have interfered with the obstruction 51 and not fully seated onto the plastic holder 25.

Another distinction of the modified cap 41 is that the modified cap 41 has only two ramp-shaped ribs 21-1 and 21-2. The primary purpose of the ramp-shaped ribs 21 is to hold the non-plastic part 23 within the product cavity 27 with an interference fit so that the non-plastic part 23 will not rattle within the product cavity 27. This may be accomplished with two ramp-shaped ribs 21 (as illustrated in FIG. 8) or even one ramp-shaped rib 21.

Although FIGS. 2, 6 and 8 illustrated the ramp-shaped ribs 21 as being attached to the plastic cap 11/14 it would be possible to have the ramp-shaped members 21 attached to the floor of the product cavity 27. Under either circumstance, the ramp-shaped ribs 21 would engage the side edges of the non-plastic part 23 to hold the non-plastic part 23 in the product cavity 27 with an interference fit, which prevents the non-plastic part 23 from rattling within the product cavity 27.

The caps 11 and 41 and holder 25 have been described as being formed of acrylonitrile butadiene styrene (ABS) thermoplastic. ABS is a copolymer derived from acrylonitrile, butadiene, and styrene. The advantage of ABS is that this material combines the strength and rigidity of the acrylonitrile and styrene polymers with the toughness of the polybutadiene rubber, producing a tough, impact and heat resistant product. In addition, ABS plastics have desirable electrical properties. However, it should be appreciated that other materials may be employed in the present invention to achieve one or more of these recognized advantages to differing degrees.

The caps 11 and 41 and holder 25 of the present invention provide greater dimensional consistency in high-volume manufacturing. They also provide a much stronger attachment of a magnet or other non-plastic part 23, thus extending the life-expectancy of the ultimate product. One application of the present invention is to use the plastic cap 11/41 and plastic holder 25 in a telephone set, such as an Avaya desktop telephone, to attach a magnet within the telephone base.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

We claim:

1. A device for attaching parts made of dissimilar materials comprising:
    a plastic holder having a recess and at least one groove;
    a non-plastic part disposed within said recess;
    a plastic cap superimposed over said non-plastic part, said plastic cap including at least one wing to fit within said at least one groove of said plastic holder; and
    a fixed joint formed between said plastic holder and said plastic cap to capture said non-plastic part within said recess of said plastic holder, wherein at least one of said plastic cap and said plastic holder includes at least one ramp-shaped rib engaging said non-plastic part to wedge said non-plastic part within said recess when said plastic cap is joined to said plastic holder by said fixed joint.

2. The device of claim 1, wherein said at least one ramp-shaped rib engages a side surface of said non-plastic part to wedge said non-plastic part within said recess when said plastic cap is joined to said plastic holder by said fixed joint.

3. The device of claim 1, wherein said fixed joint is formed by heat staking or by ultrasonic welding said plastic cap to said plastic holder.

4. The device of claim 1, wherein said plastic cap and said plastic holder are formed of acrylonitrile butadiene styrene (ABS) thermoplastic.

5. The device of claim 1, wherein said non-plastic part is a magnet.

6. The device of claim 1, wherein said recess is cylindrical in shape, and wherein said non-plastic part is disc-shaped.

7. The device of claim 1, wherein said plastic holder includes three grooves and said plastic cap includes three wings to fit within said three grooves of said plastic holder.

8. The device of claim 1, wherein said fixed joint is formed between said at least one wing of said plastic cap and said at least one groove of said plastic holder.

9. The device of claim 8, wherein said non-plastic part is a magnet.

\* \* \* \* \*